United States Patent
Zhang

(10) Patent No.: US 9,736,443 B2
(45) Date of Patent: Aug. 15, 2017

(54) ADAPTIVE IMAGE MANAGEMENT OF A PROJECTOR SYSTEM

(71) Applicant: INTEL CORPORATION, Santa Clara, CA (US)

(72) Inventor: Yanli Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 13/784,729

(22) Filed: Mar. 4, 2013

(65) Prior Publication Data

US 2014/0247288 A1    Sep. 4, 2014

(51) Int. Cl.

| | |
|---|---|
| G09G 5/10 | (2006.01) |
| H04N 9/31 | (2006.01) |
| H04N 5/58 | (2006.01) |
| G09G 3/34 | (2006.01) |
| G03B 21/20 | (2006.01) |
| G06F 1/32 | (2006.01) |
| H04N 21/41 | (2011.01) |
| H04N 21/431 | (2011.01) |
| H04N 21/44 | (2011.01) |

(52) U.S. Cl.
CPC ....... *H04N 9/3194* (2013.01); *G03B 21/2053* (2013.01); *G06F 1/325* (2013.01); *G06F 1/3218* (2013.01); *G06F 1/3265* (2013.01); *G09G 3/3406* (2013.01); *H04N 5/58* (2013.01); *H04N 9/3155* (2013.01); *H04N 9/3182* (2013.01); *H04N 21/4122* (2013.01); *H04N 21/4318* (2013.01); *H04N 21/44008* (2013.01); *G09G 3/3413* (2013.01); *G09G 2320/0646* (2013.01); *G09G 2360/16* (2013.01); *Y02B 60/1242* (2013.01)

(58) Field of Classification Search
CPC ... G09G 2320/0233; G09G 2320/0646; G09G 2310/027; G09G 3/36; G09G 5/10; G06F 1/1639; H04N 5/74
USPC .......... 345/87–100, 690; 348/607, 779, 756; 353/31, 39, 122
See application file for complete search history.

(56) References Cited

U.S. PATENT DOCUMENTS 7,825,893 B2    11/2010    Oka et al.
2006/0268180 A1 *  11/2006    Chou ............................ 348/673
(Continued)

FOREIGN PATENT DOCUMENTS

EP    1701331 A1    9/2006
EP    2124218 A2    11/2009
(Continued)

OTHER PUBLICATIONS

Dolby, "Dolby's High-Dynamic Range Technologies: Breakthrough TV Viewing", 2008, 9 Pages.
(Continued)

*Primary Examiner* — Jennifer Mehmood
*Assistant Examiner* — James Nokham
(74) *Attorney, Agent, or Firm* — Lowenstein Sandler LLP

(57) ABSTRACT

Content adaptive power management technologies of projector systems are described. One method analyzes image data to be displayed by a projector system. A projector brightness of a light source of the projector system is adjusted based on the analyzed image data. The pixel values of the image data input into an imager of the projector system are adjusted based on the analyzed image data.

22 Claims, 7 Drawing Sheets

(56) References Cited

U.S. PATENT DOCUMENTS

| | | | |
|---|---|---|---|
| 2007/0035706 A1* | 2/2007 | Margulis | G03B 21/00 353/122 |
| 2007/0046596 A1* | 3/2007 | Sakakibara et al. | 345/87 |
| 2007/0183678 A1 | 8/2007 | Sankar et al. | |
| 2007/0291048 A1 | 12/2007 | Kerofsky | |
| 2008/0084510 A1* | 4/2008 | Toyooka | 348/779 |
| 2008/0106703 A1 | 5/2008 | Miyazawa | |
| 2009/0115719 A1 | 5/2009 | Lin et al. | |
| 2009/0185140 A1* | 7/2009 | Chen | G03B 21/14 353/31 |
| 2009/0219244 A1 | 9/2009 | Fletcher et al. | |
| 2009/0322795 A1* | 12/2009 | Vasquez et al. | 345/690 |
| 2010/0309391 A1* | 12/2010 | Plut | H04N 9/3147 348/756 |
| 2011/0018897 A1 | 1/2011 | Uchiyama et al. | |
| 2011/0069234 A1* | 3/2011 | Kaise et al. | 348/607 |
| 2011/0187733 A1 | 8/2011 | Sun et al. | |
| 2011/0228174 A1 | 9/2011 | Lai et al. | |
| 2011/0234994 A1* | 9/2011 | Uchiyama | 353/70 |
| 2011/0298832 A1* | 12/2011 | Lai | G09G 3/3413 345/690 |
| 2012/0170136 A1 | 7/2012 | Kubota | |

FOREIGN PATENT DOCUMENTS

| | | |
|---|---|---|
| JP | 2008129251 A | 6/2008 |
| JP | 2008216560 A | 9/2008 |
| KR | 10-2012-0026109 A | 3/2012 |

OTHER PUBLICATIONS

International Search Report and Written Opinion received for PCT Patent Application No. PCT/US2014/018955, mailed on Jun. 2, 2014, 16 pages.

Kerofsky et al., "Brightness Preservation for LCD Backlight Dimming," Sharp Laboratories of America, Inc., No. 95, Feb. 2007, pp. 50-57.

Kim et al., "Technical Evolution of Liquid Crystal Displays," NPG Asia Materials, dated Oct. 21, 2009, pp. 29-36.

Panasonic, "Panasonic Ideas for Life", Binuonlc Protetelonal Video Products—LB Series Daylight View, Feb. 22, 2013, 1 page available at: www.panalllinlc.comlbu81nel&provldeolpmmollb20Erludayllghtvlew.a.

Office Action dated Jul. 26, 2016, for Japanese Patent Application No. 2015-556268, 10 pages.

Notice of Preliminary Rejection dated Jun. 24, 2016, for Korean Patent Application No. 10-2015-7020994, 15 pages.

* cited by examiner

ADAPTIVE IMAGE MANAGEMENT OF A PROJECTOR SYSTEM

TECHNICAL FIELD

Embodiments described herein generally relate to processing devices and, more specifically, relate to content adaptive power management of projector systems.

BACKGROUND

Projector systems can turn any surface into a display surface. Integrated with interactivity mechanism, projector systems can turn any surface or space into an interactive surface or space, thus enabling interesting usage models. There has been research and development in this area of interactive projector systems. Reducing system power of projector systems is and will become more important when it comes to the production of these projector systems. For some projector systems, there are three main components: a light source, an imager, and projection optics. The imager may be a micro-display and its power consumption is usually very small in the range of tens or hundreds of milliwatts. The light source is typically the biggest power consumer in the projection system and utilizes a larger portion of system space for thermal management. Some projector systems use traditional lamps. To improve the light source efficiency, light emitting diode (LEDs) technology is often used instead of traditional lamps, especially Red-Green-Blue (RGB) LEDs. RGB LEDs can help eliminate the color wheel or dichroic mirror/prisms used in the projector system. Currently for LED based projector systems, the light source power consumption is roughly 1 W for 10 lumens. More efficient light sources such as hybrid light source or laser light source are being developed. Some light source power saving technologies focus on improving the light source efficiency. In current projection systems, the light source is usually always fully on. In some projector systems with high lumens a brightness adjustment of the light source may be made based on ambient light. In this case an ambient light sensor can be used to detect the ambient light intensity to adjust the projector brightness based on the ambient light measured by the ambient light sensor.

DESCRIPTION OF EMBODIMENTS

Content adaptive power management technologies of projector systems are described. One method analyzes image data to be displayed by a projector system. A projector brightness of a light source of the projector system is adjusted based on the analyzed image data. The pixel values of the image data input into an imager of the projector system are adjusted based on the analyzed image data. For example, the projector brightness can be adjusted based on the brightness of the images to reduce power consumption by the projector system. For example, the light source power may be lower for dark images than for brighter images.

As described above, reducing system power of projector systems is and will become more important when it comes to the production of projector systems, including interactive projector systems. The light source of some current projection systems is continuously on. Some previous solutions include adjusting the brightness of the light source based on ambient light as measured by an ambient light sensor. These systems are not designed to save power of the projector system, but to provide the appropriate light given the ambient light. The embodiments described herein provide power management of the light source based on content analysis of the image. The power management technologies can make adjustments to the brightness of the light source based on the content analysis as well as adjustments to the pixel values. For example, the power management technologies can make backlight adjustments on the light source, as well as image enhancements to the pixel values sent to the imager for display. With content adaptive light source power saving methods, the light source can be modulated depending on the content, thus saving the light source power. For example, if the projected image is a mid-gray, then the light source can be dimmed, and the pixel values (also referred to herein as pixel intensity) can be increased (e.g., "boosted") to achieve the equivalent user perception. An advantage of the one or more embodiments is that it can help reduce the projector light source power, while providing an almost equivalent visual experience to the end users.

Figure 1:
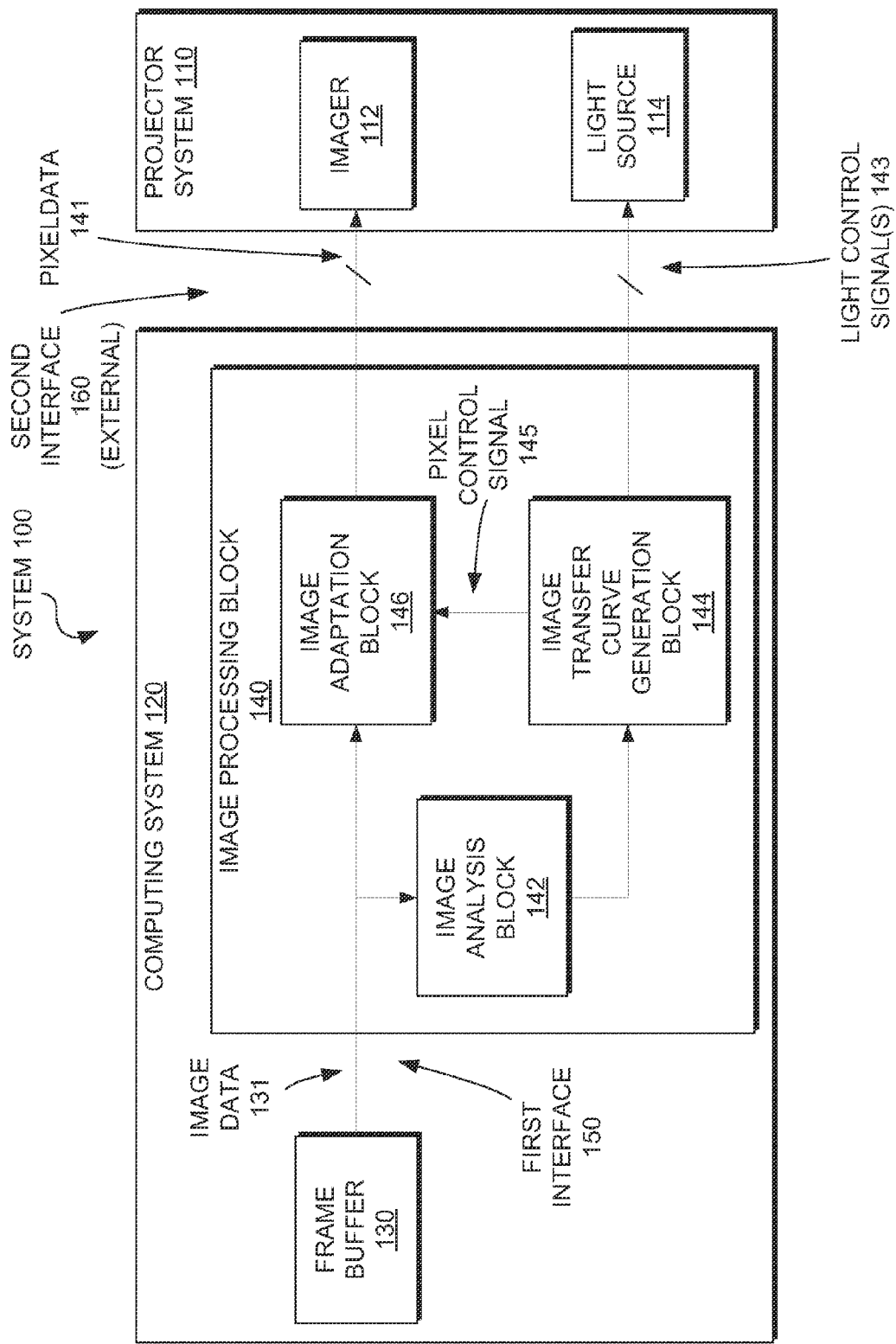
FIG. 1 is a block diagram of one embodiment of a system including a projector system and a computing system with an image processing block for content adaptive power management of the projector system.

FIG. 1 is a block diagram of one embodiment of a system 100 including a projector system 110 and a computing system 120 with an image processing block 140 for content adaptive power management of the projector system 110.

The projector system 110 includes an imager 112 and a light source 114. The projector system 110 may be a digital light projection (DLP) projector system, a Liquid Crystal on Silicon (LCoS) projector system. The imager 112 of a DLP projector system includes micro-mirrors that either directs the light of the light source 114 through or not. The gray scale may be generated by how long the micro-mirrors are turned on or turned off. The imager 112 of a LCoS projector system includes micro-reflective liquid crystal display that modulates the light of the light source 114 to let light through or not in a digital fashion, much like DLP projector systems, or modulates the light of the light source 114 to control the amount of light going through in an analog fashion. As described above, with the conventional projector system architectures, the light source can be fully on or possibly dimmed based on the ambient light. The image processing block 140 can implement a content adaptive light source power saving method to modulate the light source 114 depending on image analysis of the content of the image (e.g., image data 131). By modulating the light source 114, the image processing block 140 can reduce the power consumption of the light source 114, thus reducing power consumption of the system 100. For example, if the projected image is a mid-gray on a lightness scale (e.g. maximum RGB value is 46% brightness in RGB color space), then the light source 114 can be dimmed, and the pixel intensity of the pixel data 141 (e.g., pixel values) can be boosted to achieve substantially equivalent user perception of the projected image. Alternatively, the pixel data 141 may not be adjusted when there is tolerance for less than equivalent user perception of the projected image.

The computing system 120 can comprise an integrated circuit (IC) including a graphics controller, a processor, a processing device, a controller, a microcontroller, a microprocessor, a central processing unit (CPU), a graphics processing unit, a video processing unit, an image processing unit, or other types of devices that have a processing element to perform the operations described below with respect to the image processing block 140. The computing system 120 can comprise a graphics IC (also referred to as "graphics chip"), a video processor IC (also referred to as "video chip"), or a display controller IC (also referred to as a "display controller chip"). In another embodiment, the computing system 120 comprises a multi-core system, which is a single computing component with two or more independent actual central processing units (CPUs), which may be functional units that read and execute program instructions. The multi-core systems implements multiprocessing in a single physical package. In some embodiments, the image processing block 140 may be implemented in a graphics core or a video core of the multi-core system that is used to drive a display over a display interface. For example, graphic cores may be used in multi-core systems to accelerate the building of images intended for output to a display.

The computing system 120 includes a frame buffer 130 and an image processing block 140. The image processing block 140 includes an image analysis block 142, an image transfer curve generation block 144, and an image adaptation block 146. The image processing block 140 receives image data 131 from the frame buffer 130 over a first interface 150. The first interface 150 may be an internal interface (e.g., a processor bus, a local I/O bus, a hub interface bus, an internal bus, a system bus, a point-to-point (P2P) connection, or the like) or an external interface (e.g., an external bus interface, a front side bus, a display interface, a video display interface (e.g., DVI, HDMI, VGA), a graphics interface, or the like) depending on whether the frame buffer 130 is on the same integrated circuit (IC) die substrate as the image processing block 140. The image processing block 140 outputs pixel data 141 to the imager 112 of the projector system 110 and light control signal(s) 143 to the light source 114 of the projector system 110 over a second interface 160. The light control signals 143 may also be referred to as backlight control signals in some contexts. In this embodiment, the second interface 160 is an external interface since the computing system 120 is a separate device than the projector system 110. In other embodiments, the second interface can be an internal interface when the image processing block 140 is implemented in the projector system itself, such as in a power saving block of the projector system, such as illustrated and described below with respect to FIG. 2.

In this embodiment, the image analysis block 142 and the image adaptation block 146 both receive the image data 131 from the frame buffer 130. The image transfer curve generation block 144 is coupled to the output of the image analysis block 142. The image adaptation block 146 also receives a pixel control signal 145 from an output of the image transfer curve generation block 144. The image adaptation block 146 outputs the pixel data 141 to the imager 112 and the image transfer curve generation block 144 outputs the light control signal(s) 143) to the light source 114.

During operation, the image processing block 140 of the computing system 120 can perform content adaptive power management for the projector system 110. In one embodiment, the image processing block 140 receives the image data 131 to be displayed by the projector system 110 and analyzes image data 131 and adjusts a projector brightness of the light source 114 using the light control signal 143 based on the analyzed image data. The image processing block 140 may also adjust pixel values of the image data and send the adjusted pixel values as the pixel data 141 on the second interface 160 to the imager 112.

In another embodiment, the image analysis block 142 is to receive the image data 131 on the first interface 150. The image analysis block 142 is configured to calculate a color histogram representing a distribution of colors in the image data 131. For digital images, a color histogram represents the number of pixels that have colors in each of a fixed list of color ranges that span the image's color space. The color histogram can be built for any kind of color space, although the color histograms are typically three-dimensional spaces like red-green-blue (RGB), hue-saturation-lightness (HSL), hue-saturation-value (HSV) (also called hue-saturation-brightness (HSB)) or hue-saturation-intensity (HSI). Alternatively, other three cylindrical models can be used. Because HSL, HSV and HSI are simple transformations of device-dependent RGB models, the physical colors they define depend on the colors of the red, green, and blue primaries of the device or of the particular RGB space, and on the gamma correction used to represent the amounts of those primaries. Each unique RGB device therefore has unique HSL, HSV and HSI spaces to accompany it, and numerical HSL, HSV or HSI values describe a different color for each basis RGB space. In one embodiment, the color histogram is based on a maximum value in RGB color space (e.g., max (R, G, B) value). Thus, the maximum value is determined in the image analysis of the image data 131. The max (R, G, B) value is an indicator for image brightness and parameter for pixels processing. Other indicators may be used, such as Y in YUV color space. In YUV color space, Y is defined as 0.299R+0.587G+0.114B based on NTSC standard. In another type of image analysis, the V in the HSV color space can be determined. In another type of image analysis, the B value in the HSB color space can be determined. Alternatively, other image analysis methods may be used to analyze the image data 131 in order to generate a pixel transformation curve as described in more detail below.

Figure 4:
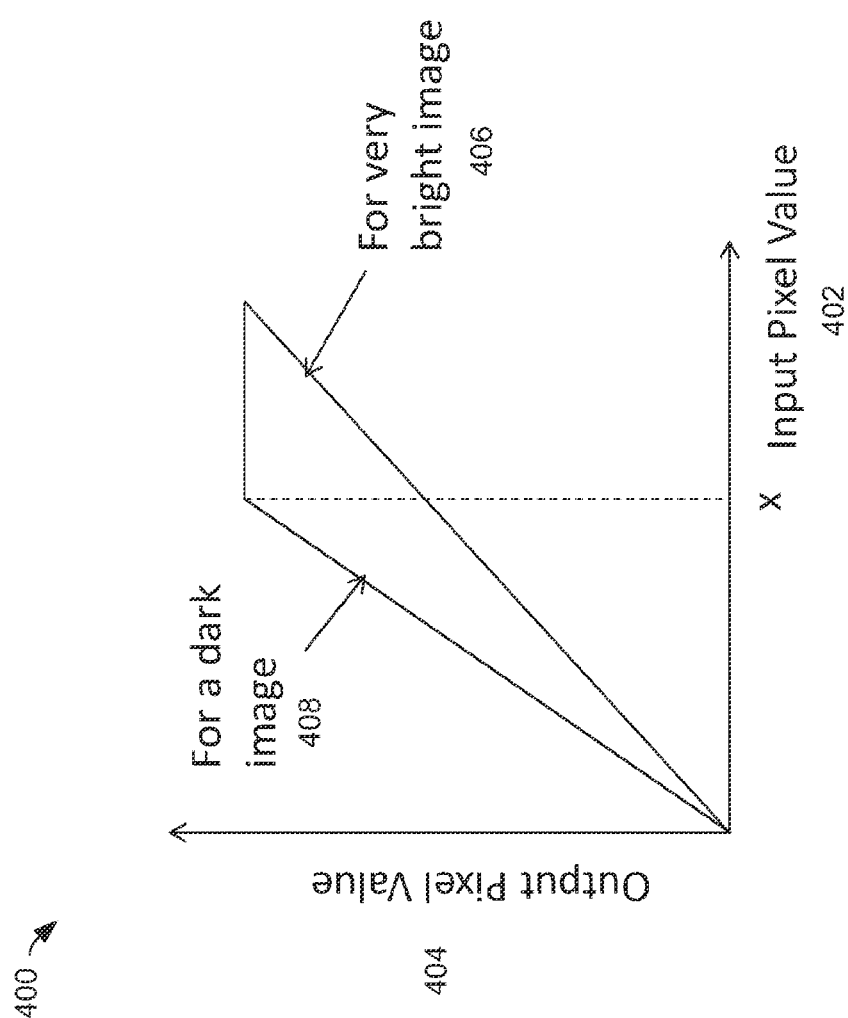
FIG. 4 is a graph illustrating two pixel transformation curves, generated by the image processing block, for content adaptive power management of the projector system.

The image transfer curve generation block 144 is coupled to an output of the image analysis block 142. The image transfer curve generation block 144 is configured to create a pixel transformation curve based on the color histogram generated by the image analysis block 142. Two different pixel transformation curves are illustrated in FIG. 4 described below. The pixel transformation curve may be stored as a look-up-table (LUT). As described in more detail below, the image adaptation block 146 can use the LUT to boost pixel intensity of the pixel data 141 and dim the light source 114 correspondingly. The image transfer curve generation block 144 is also configured to modulate the light control signal 143 on the second interface 160 to adjust the projector brightness of the light source 114 and to modulate a pixel control signal 145 that is input into the image adaptation block 146.

The image adaptation block 146 is to receive the image data 131 on the first interface 150 and the pixel control signal 145 from the image transfer curve generation block 144. The image adaptation block 146 is configured to adjust the pixel values of the image data 131 based on the pixel control signal 145 and to send the adjusted pixel values as the pixel data 141 on the second interface 160 to the imager 112. As described above, the pixel control signal 145 can be controlled based on the pixel transformation curve generated by the image transfer curve generation block 144. For example, the image adaptation block 146 can perform a look-up operation in the LUT using the pixel values of the image data 131 to determine corresponding adjusted pixel values to be output as the pixel data 141 to the imager 112.

In another embodiment, three separate color light sources, such as RGB LEDs, are used as the light source 114 in the projector system 110. This may be done to eliminate the color wheels or color filters since the colors can be generated time sequentially in the projector system 110 with fast switching speed of micro-displays. However, due to the slow switching speed of direct view liquid crystal displays (LCDs), time sequential color may be hard to achieve for direct view LCDs. Together with cost and total system efficiency considerations, RGB LEDs are rarely used in the mobile direct-view LCDs. Three color light sources, like RGB LEDs, in the projector system 110 may provide additional power saving opportunities. In some embodiments, the image processing block 140 can perform power management based on each color sub-frame, such as R sub-frames, G sub-frames, B sub-frames, for potentially more power savings. For a simple example, if an image has pure red, then G and B LED light source can be turned off. Alternate combinations of these light sources can be turned off.

In system 100, the content adaptive power management (e.g., image processing block 140) for the projector system 110 is implemented on the computing system 120 and the computing system 120 sends the display data (e.g., pixel data 141) and the light control signal 143 to the projector system 110. In another embodiment, the image processing block 140 can be implemented in the projector system itself as described and illustrated with respect to FIG. 2.

When the content adaptive power management is implemented on the computing system 120 that sends the display data to the projector system, there may be various implementation architectures, two of which are described below.

In one embodiment, the image processing block 140 modulates the light source 114 at the same ratio as the ratio for modeling the pixel values as described herein. The light source 114 may be a single white light source or may be separate color light sources, such as the RGB light sources. In this case, the content adaptive light source power saving method can be same as that used for direct-view backlight power saving. For example, the image analysis is based on the max (R, G, B) value. The computing system 120 does the image processing and sends the modulated pixel data 141 and light control signals 143 to the projector system 110 over the second interface 160. The second interface 160 may be a standard display interface. The projector system 110 is configured to modulate the light source 114 based on the light control signal(s) 143 and display the modulated pixel data 141. The image processing block 140 can modulate the separate color light sources at the same ratio or at different individual ratios.

In another embodiment, the image processing block 140 modulates the light source 114 (e.g., RGB light source) at different ratios than the ratio for modeling the pixel values as described herein. Also, the image processing block 140 can modulate the separate color light sources at different individual ratios. In this case, the image analysis may be done based on color sub-frames (e.g., R, G, B sub-frames). Similarly, three LUTs may be used for the different pixel transformation curves determined for the three colors. Three different backlight dimming ratios may also be used to modulate the corresponding light control signal for the respective color. In one embodiment, instead of sending pixel data 141 as a sequence of pixels which has R, G, B values, the computing system 120 can send the pixel data 141 time sequentially, such as in a data format where the R, G, B sub-frames are sent sequentially in time. That is, the image processing block 140 can send the red components of the pixel data first, then green components of the pixel data second, and then the blue components of the pixel data third, or in other order combinations. It should be noted that in some of these embodiments, the frame buffer could be removed. In a standard way, frame data is sent in sequence of pixels, including R,G,B data, instead of in sequence of R component of all pixel data, then G component of all pixel data, and then B component of all pixel data. For example, in the system 100 as illustrated by FIG. 1, if the frame data is sent to the projector system 110 in a standard way, then the frame buffer 130 is needed in the system 100. However, if the pixel reformatting is done before sending to the projector system 110, then no frame buffer may be needed in the system 100. In this embodiment, the projector system 110 can include a decoding mechanism(s) to decode the time sequential data format and a mechanism(s) to adjust the light source 114 accordingly.

Some or all of the components of FIG. 1 can reside on "a common carrier substrate," such as, for example, an IC die substrate, a multi-chip module substrate or the like. Alternatively, the computing system 120 may reside on one or more printed circuit boards, such as, for example, a mother board, a daughter board or other type of circuit card, and the projector system 110 may reside on one or more printed circuit boards. These circuit boards could communicate over a display interface as described herein.

Figure 2:
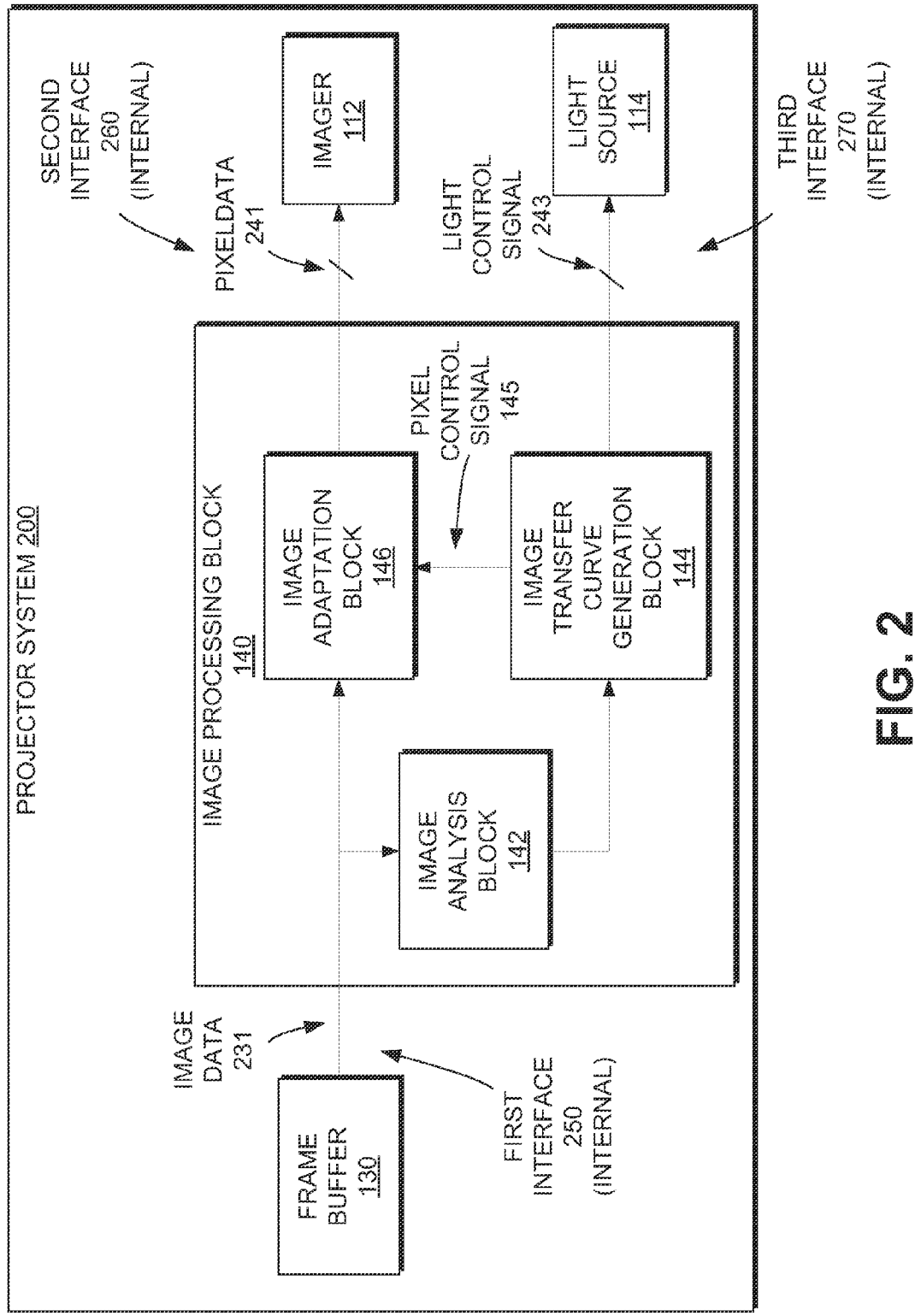
FIG. 2 is a block diagram of one embodiment of a projector system with an image processing block for content adaptive power management of the projector system.

FIG. 2 is a block diagram of one embodiment of a projector system 200 with an image processing block 140 for content adaptive power management of the projector system 200.

The projector system 200 includes the frame buffer 130, image processing block 140, imager 112 and light source 114. The frame buffer 130, imager 112, light source 114, or any combination thereof may be integrated on the same IC die substrate as the image processing block 140. These components may be similar to the components described with respect to FIG. 1 as noted by the same reference numbers, except as specifically noted. Since the image processing block 140 of FIG. 2 is integrated in the projector system 200, the image processing block 140 is coupled to the frame buffer 130 via a first interface 250, the imager 122 via a second interface 260, and the light source 114 via a third interface 270. The image processing block 140 outputs pixel data 241 to the imager 112 on the second interface 260 and light control signal(s) 243 to the light source 114 over the third interface 270. The interfaces 250-270 are internal interfaces. The projector system 200 may be a digital light projection (DLP) projector system, a LCoS projector system or the like.

During operation, the image processing block 140 of the projector system 200 can perform content adaptive power management for the projector system 200. In one embodiment, the image processing block 140 receives the image data 231 from the frame buffer 130 to be displayed by the projector system 200 and analyzes image data 231 and adjust a projector brightness of the light source 114 using the light control signal(s) 243 based on the analyzed image data. The image processing block 140 may also adjust pixel values of the image data and send the adjusted pixel values as the pixel data 241 on the second interface 260 to the imager 112.

In another embodiment, three separate color light sources, such as RGB LEDs, are used as the light source 114 in the projector system 200 as described above. When the content adaptive power management is implemented on the projector system 200 itself, the different color sub-frame pixel data, such as the R, G, B sub-frames, may be generated from the image data 231 before the image processing bock 140 and the image processing block 140 can perform image analysis based on the sub-frame pixel data. In another embodiment, the image processing block 140 can generate the sub-frame pixel data as part of the image processing. The image processing block 140 can perform image analysis separately on R, G and B sub-frames as described and illustrated with respect to FIG. 3.

Figure 3:
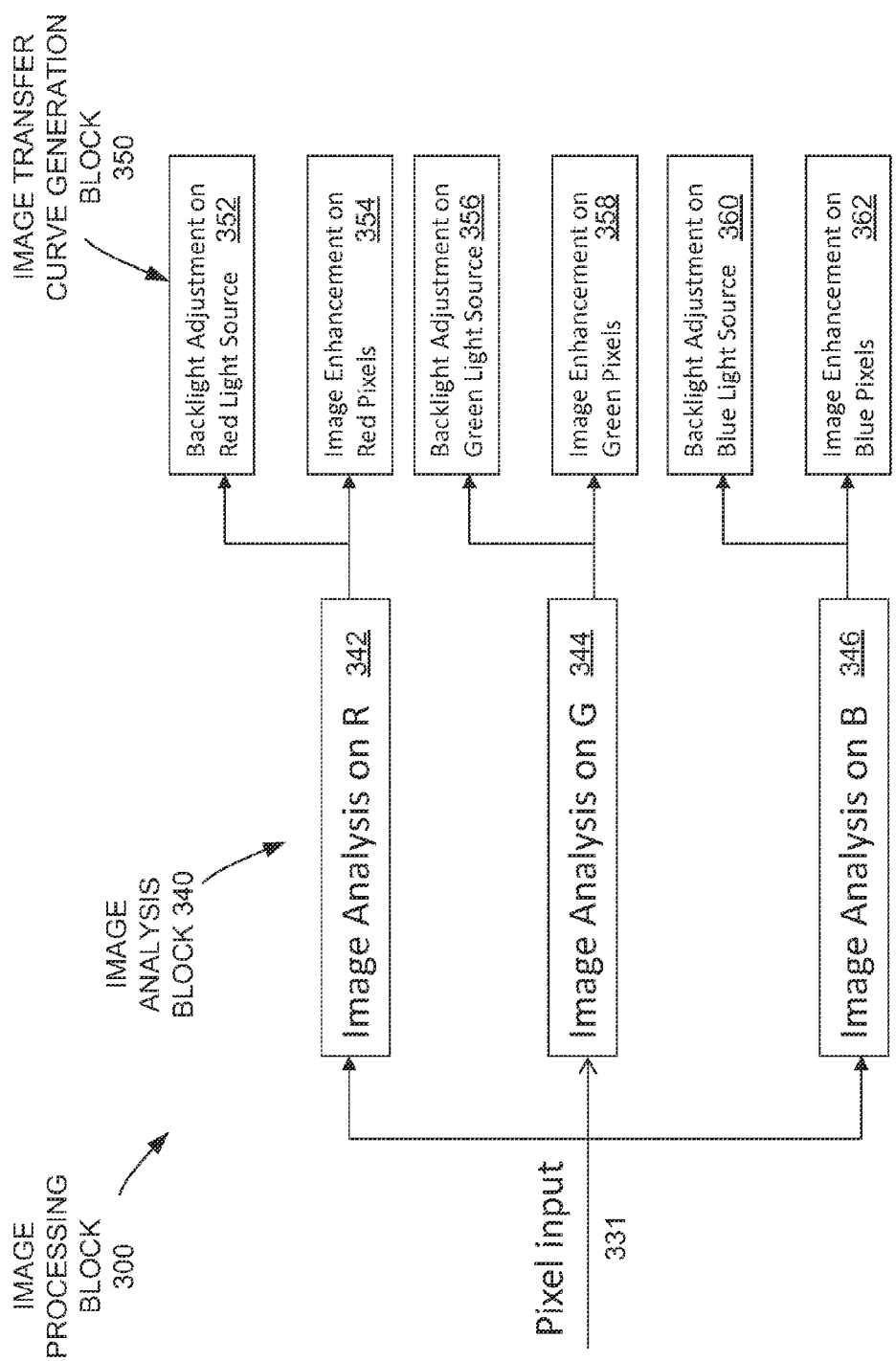
FIG. 3 is a block diagram of one embodiment of an image processing block for separately processing image data based on red, green and blue sub-frames.

FIG. 3 is a block diagram of one embodiment of an image processing block 300 for separately processing image data based on red, green and blue sub-frames. In this embodiment, the image processing block 300 includes an image analysis block 340 and an image transfer curve generation block 350. The image analysis block 340 separately performs first image analysis of red components of pixel input 331 (block 342), second image analysis of green components of the pixel input 331 (block 344) and third image analysis of blue components of the pixel input 331 (block 346). The image transfer curve generation block 350 determines a first backlight adjustment on a red light source (block 352) and first image enhancements on red pixel data (block 354) based on the first image analysis at block 342. The image transfer curve generation block 350 determines a second backlight adjustment on a green light source (block 356) and second image enhancements on green pixel data (block 358) based on the second image analysis at block 344. The image transfer curve generation block 350 determines a third backlight adjustment on a blue light source (block 360) and third image enhancements on blue pixel data (block 362) based on the third image analysis at block 346.

For projector systems with RGB light sources, which is different from the projector system with a white light source and color filters/wheels, individual light source modulation based on individual sub-color image analysis can increase power savings.

FIG. 4 is a graph illustrating two pixel transformation curves 406 and 408, generated by an image processing block, for content adaptive power management of a projector system. The pixel transformation curve 406 may correspond to very bright images, such as a full white screen. In this case, there may be no room, or little room, to further enhance the pixel value, so the slope of the pixel transformation curve 406 is 1. That is, there is no change on the input pixel value, which corresponds to no light source power savings based on the content adaptive power management. The pixel transformation curve 408 may correspond to a dark image. In this case, the input pixel values below a threshold, x, are enhanced with a ratio greater than 1. In some scenarios, there would be no input pixel data with values greater than the threshold x. So, when the backlight (e.g., white light source) is dimmed at a ratio corresponding to the enhancement ratio as defined by the pixel transformation curve 408, a user may perceive a substantially equivalent image after the pixel data modulation and the light source modulation as compared to an original image without light source modulation. However, in other scenarios, there may be some distortions for the input pixel data with values greater than the threshold x. The transformation curves 406 and 408 may be static as well as adaptive where the transformation curves could be non-linear. When adaptive, the transformation curves 406 and 408 may minimize the perceived image distortion while maximizing the power saving.

Figure 5:
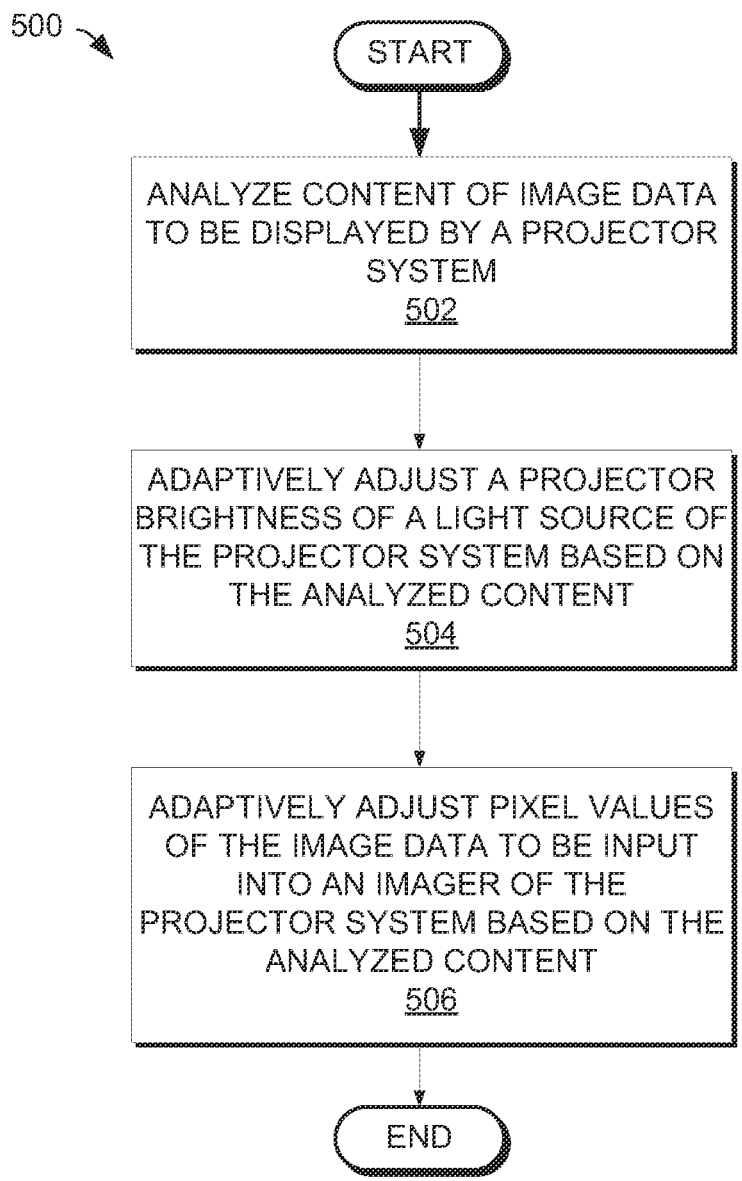
FIG. 5 is a flow diagram illustrating a method of light source power management based on content analysis of image data according to an embodiment.

FIG. 5 is a flow diagram illustrating a method 500 of light source power management based on content analysis of image data according to an embodiment. Method 500 may be performed by processing logic that may comprise hardware (e.g., circuitry, dedicated logic, programmable logic, microcode, etc.), software (such as instructions run on a processing device), firmware or a combination thereof. In one embodiment, method 500 is performed by computing system 120 of FIG. 1. In another embodiment, the method 500 is performed by the projector system 200. In another embodiment, the method 500 is performed by the image processing block 140 of FIGS. 1 and 2.

Referring to FIG. 5, the method 500 begins by the processing logic analyzing image data to be displayed by a projector system (block 502). The processing logic adjusts a projector brightness of a light source of the projector system based on the analyzed image data (block 504). The processing logic also adjusts pixel values of the image data to be input into an imager of the projector system based on the analyzed image data (block 506), and the method 500 ends.

In a further embodiment, the processing logic adjusts the pixel values by modulating the pixel values by a first ratio. This first ratio may be considered a dimming ratio, or a percentage of the light source being turned fully on, or a percentage of how much the light source should be dimmed. The processing logic may also adjust the projector brightness by modulating a light control signal that drives the light source. The processing logic can modulate the light source at a same ratio as the first ratio at which the pixel values are modulated. In another embodiment, the processing logic can modulate the light source at a second ratio that is different than the first ratio at which the pixel values are modulated.

In another embodiment, the processing logic adjusts the pixel values base on a pixel transformation curve. The pixel transformation curve may be stored as a LUT. The processing logic performs a look-up operation in the LUT with an input pixel value to determine an adjusted pixel value for each of the pixel values of the image data.

In another embodiment, the processing logic analyzes the image data by calculating a color histogram representing a distribution of colors in the image data and creating the pixel transformation curve based on the color histogram. In one embodiment, the processing logic determines a maximum value in a RGB color space (e.g., max (R,B,G)). In another embodiment, the processing logic determines a value V of a HSV color space. In another embodiment, the processing logic determines a brightness value (B) of a HSB color space.

In one embodiment, the processing logic sends the modulated pixel values and the light control signal over a display interface of the projector system. The projector system is configured to modulate the light source according to the light control signal received over the display interface.

Figure 6:
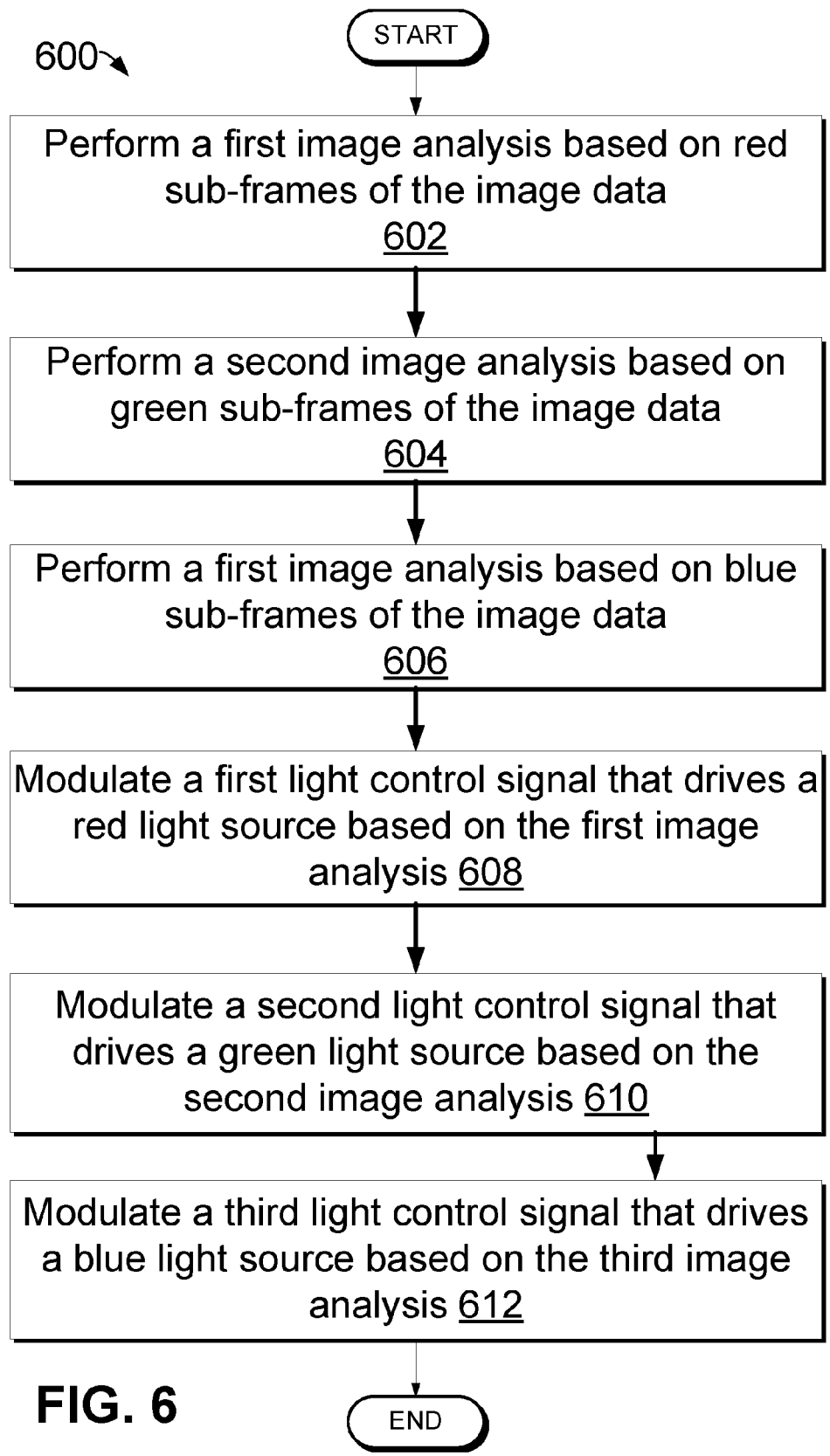
FIG. 6 is a flow diagram illustrating a method of light source power management for red, green, blue light sources according to another embodiment.

FIG. 6 is a flow diagram illustrating a method 600 of light source power management for red, green, blue light sources according to another embodiment. Method 600 may be performed by processing logic that may comprise hardware (e.g., circuitry, dedicated logic, programmable logic, microcode, etc.), software (such as instructions run on a processing device), firmware or a combination thereof. In one embodiment, method 600 is performed by computing system 120 of FIG. 1. In another embodiment, the method 600 is performed by the projector system 200. In another embodiment, the method 600 is performed by the image processing block 140 of FIGS. 1 and 2.

Referring to FIG. 6, the method 600 begins by the processing logic performing a first image analysis of the image data based on a red (R) sub-frame (block 602). The processing logic also performs a performs a second image analysis of the image data based on a green (G) sub-frame (block 604) and performs a third image analysis of the image data based on a blue (B) sub-frame (block 606). The light source includes a red light source, a green light source, and a blue light source. The processing logic adjust the pixel values by determining first image enhancements on red pixel data based on the first image analysis, second image enhancements on green pixel data based on the second image analysis, and third image enhancements on blue pixel data based on the third image analysis.

The processing logic adjusts the projector brightness by modulating a first light control signal that drives the red light source based on the first image analysis (block 608). The processing logic also modulates a second light control signal that drives the green light source based on the second image analysis (block 610) and modulates a third light control signal that drives the blue light source based on the third image analysis (block 612). In a further embodiment, the processing logic modulates the first light control signal at a first ratio, the second light control signal at a second ratio and the third light control signal at a third ratio.

In another embodiment, the processing logic analyzes the image by creating a first pixel transformation curve based on the first image analysis, a second pixel transformation curve based on the second image analysis, and a third pixel transformation curve based on the second image analysis. The first image enhancements on the red pixel data can be determined based on the first pixel transformation. The second enhancement on the green pixel data can be determined based on the second pixel transformation. The third enhancement on the blue pixel data can be determined based on the third pixel transformation. In one embodiment, the first pixel transformation curve is stored as a first LUT, the second pixel transformation curve is stored as a second LUT and the third pixel transformation curve is stored as a third LUT. When adjusting the pixel values, the processing logic can perform look-up operations in the respective LUTs to determine adjusted pixel values for each of the input pixel values of the respective color.

Figure 7:
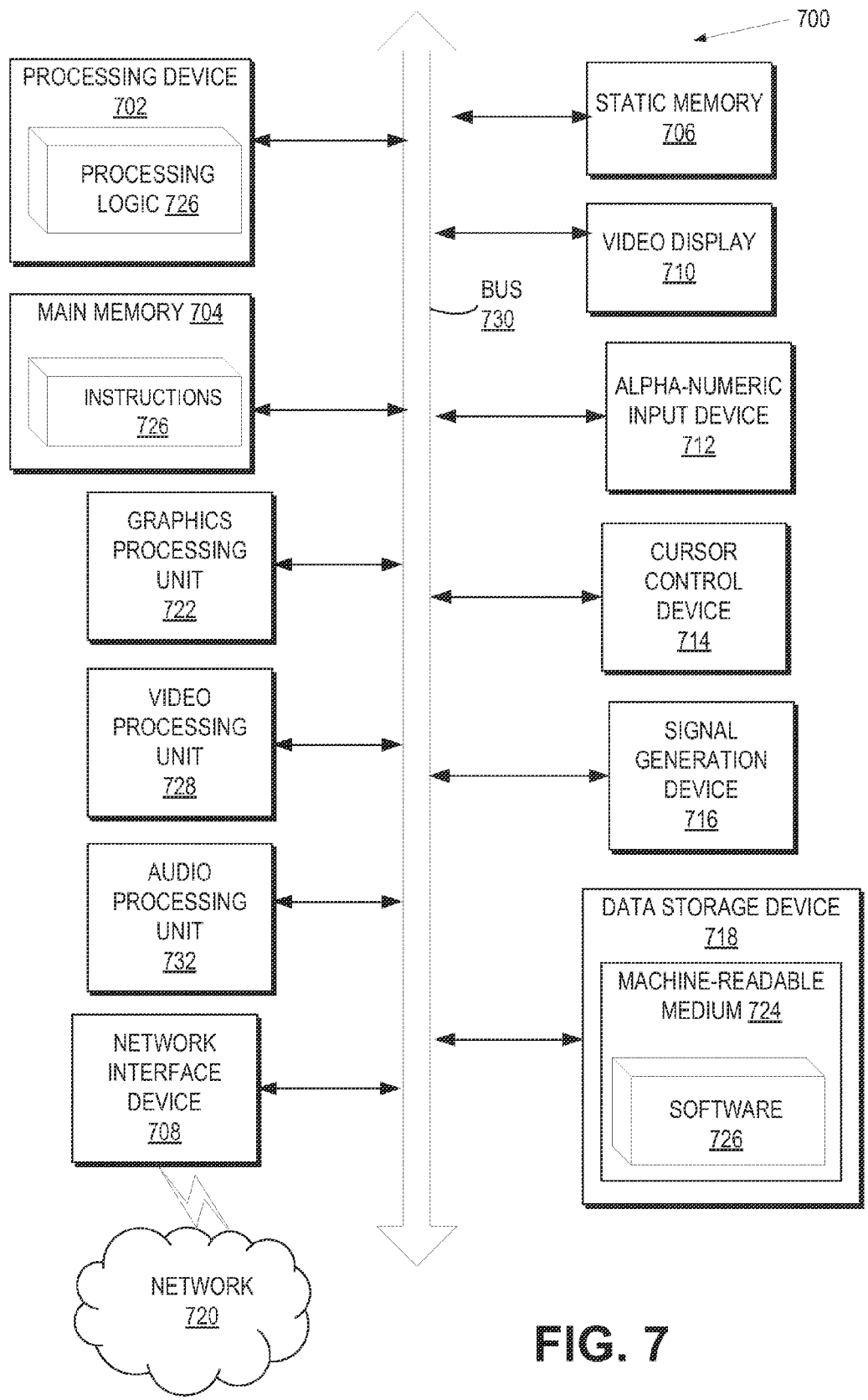
FIG. 7 illustrates a diagrammatic representation of a machine in the example form of a computer system within which a set of instructions, for causing the machine to perform any one or more of the methodologies discussed herein, may be executed.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In one embodiment, processing device 702 may include one or processing cores. The processing device 702 is configured to execute the processing logic 726 for performing the operations discussed herein. In one embodiment, processing device 702 is the same as computing system 110 of FIG. 1 that implements image processing block 140. In another embodiment, processing device 702 is the projector system 200 of FIG. 2 that implements image processing block 140. For example, processing device 702 may include the image processing block 140 of FIG. 1, image processing block 300 of FIG. 3, or any combination thereof.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a signal generation device 716 (e.g., a speaker), or other peripheral devices. Furthermore, computer system 700 may include a graphics processing unit 722, a video processing unit 728, and an audio processing unit 732. In another embodiment, the computer system 700 may include a chipset (not illustrated), which refers to a group of integrated circuits, or chips, that are designed to work with the processing device 702 and controls communications between the processing device 702 and external devices. For example, the chipset may be a set of chips on a motherboard that links the processing device 702 to very high-speed devices, such as main memory 704 and graphic controllers, as well as linking the processing device 702 to lower-speed peripheral buses of peripherals, such as USB, PCI or ISA buses.

The data storage device 718 may include a computer-readable storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting computer-readable storage media.

The computer-readable storage medium 724 may also be used to store instructions 726 utilizing the image processing block 140, such as described with respect to FIG. 1 and FIG. 2, utilizing the image processing block 300 of FIG. 3, and/or a software library containing methods that call the above applications. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus for content adaptive power management of a projector system comprising 1) a first interface to receive image data to be displayed by a projector system comprising an imager system and a light source; 2) a second interface coupled to send pixel data to the imager and a light control signal to the light source; and 3) an image processing block coupled to the first interface and the second interface, wherein the image processing block is configured to analyze the image data, adjust a light control signal for the light source based on the analyzed image data, and to adjust pixel values of the image data based on the analyzed image data and to send the adjusted pixel values as the pixel data on the second interface to the imager and the light control signal on the second interface to the light source.

In Example 2, the image processing block of Example 1 can optionally include 1) an image analysis block to receive the image data on the first interface, where the image analysis block is configured to calculate a color histogram representing a distribution of colors in the image data; 2) an image transfer curve generation block coupled to an output of the image analysis block, where the image transfer curve generation block is configured to create a pixel transformation curve based on the color histogram, to modulate the light control signal on the second interface to adjust a projector brightness of the light source, and to modulate a pixel control signal; and 3) an image adaptation block to receive the image data on the first interface and the pixel control signal from the image transfer curve generation block, where the image adaptation block is configured to adjust the pixel values of the image data based on the pixel control signal and to send the adjusted pixel values as the pixel data on the second interface to the imager.

In Example 3, the subject matter of any one of Examples 1-2 can optionally include a frame buffer coupled to the first interface of the image processing block.

In Example 4, the subject matter of any one of Examples 1-3 can optionally reside in a display controller configured to send display data comprising the pixel data and the light control signal to the projector system over the second interface, where the second interface is an external interface.

In Example 5, the subject matter of any of Examples 1-4 can optionally reside in the projector system comprising the frame buffer, the image processing block, the imager, and the light source, and where the first interface and the second interface are internal interfaces.

In Example 6, the subject matter of any of Examples 1-5 can optionally comprise a red light source, a green light source, and a blue light source, and the image processing block may be configured to perform separate image analysis of a red sub-frame, a green sub-frame, and a blue sub-frame of the image data to determine first image enhancements on red pixel data, second image enhancements on green pixel data, and third image enhancements on blue pixel data, respectively, and to determine a first backlight adjustment on the red light source, a second backlight adjustment on the green light source, and a third backlight adjustment on the blue light source.

In Example 7, the subject matter of any of Examples 1-6 can optionally be a digital light processing (DLP) projector system.

In Example 8, the subject matter of any of Examples 1-6 can optionally be a Liquid Crystal on Silicon (LCoS) projector system.

Various embodiments may have different combinations of the operational features described above. For instance, all optional features of the apparatus described above may also be implemented with respect to the method or process described herein and specifics in the examples may be used anywhere in one or more embodiments.

Example 9 is an method of content adaptive power management of a projector system comprising 1) analyzing image data to be displayed by a projector system; 2) adjusting a light control signal for the light source based on the analyzed image data; and 3) adjusting pixel values of the image data to be input into an imager of the projector system based on the analyzed image data.

In Example 10, the subject matter of Example 9 can optionally adjust the pixel values by modulating the pixel values by a first ratio.

In Example 11, the subject matter of any of Examples 9-10 can optionally adjust the pixel values by adjusting the pixel values based on a pixel transformation curve.

In Example 12, the subject matter of any of Examples 9-11 can optionally adjust the light control signal by modulating a light control signal that drives the light source.

In Example 13, the subject matter of any of Examples 9-12 can optionally modulate the light source by modulating the light source at a same ratio as the first ratio as the adjusting the pixel values.

In Example 14, the subject matter of any of Examples 9-13 can optionally modulate the light source by modulating the light source at a second ratio that is different than the first ratio.

In Example 15, the subject matter of any of Examples 9-14 can optionally store the pixel transformation curve as a look-up-table (LUT), and adjust the pixel values by performing a look-up operation in the LUT with an input pixel value to determine an adjusted pixel value for each of the pixel values.

In Example 16, the subject matter of any of Examples 9-15 can optionally analyze the image data by 1) calculating a color histogram representing a distribution of colors in the image data; and 2) creating the pixel transformation curve based on the color histogram.

In Example 17, the subject matter of any of Examples 9-16 can optionally analyze the image data further by determining a maximum value in a red-green-blue (RGB) color space.

In Example 18, the subject matter of any of Examples 9-16 can optionally analyze the image data further by determining a value (V) in a hue-saturation-value (HSV) color space.

In Example 19, the subject matter of any of Examples 9-16 can optionally analyze the image data further by determining a brightness value (B) of a hue-saturation-brightness (HSB) color space.

In Example 20, the subject matter of any of Examples 9-19 can optionally send the modulated pixel values and the light control signal over a display interface of the projector system, where the projector system is configured to modulate the light source according to the light control signal received over the display interface.

In example 21, the subject matter of any of Examples 9-20 can optionally analyze the image data by 1) performing a first image analysis of the image data based on a red (R) sub-frame; 2) performing a second image analysis of the image data based on a green (G) sub-frame; and 3) performing a third image analysis of the image data based on a blue (B) sub-frame, and wherein the adjusting the pixel values comprises: 4) determining first image enhancements on red pixel data based on the first image analysis; 5) determining second image enhancements on green pixel data based on the second image analysis; and 6) determining third image enhancements on blue pixel data based on the third image analysis.

In Example 22, the subject matter of any of Examples 9-21 can optionally comprise a red light source, a green light source, and a blue light source, where the subject matter adjusts a projector brightness of the light source by: 1) modulating a first light control signal that drives the red light source; 2) modulating a second light control signal that drives the green light source and 3) modulating a third light control signal that drives the blue light source.

In Example 23, the subject matter of any of Examples 9-22 can optionally adjust the projector brightness of the light source by: 1) modulating the first light control signal at a first ratio; 2) modulating the second light control signal at a second ratio; and 3) modulating the third light control signal at a third ratio.

In Example 24, the subject matter of any of Examples 9-23 can optionally analyzing the image data further by: 1) creating a first pixel transformation curve based on the first image analysis; 2) creating a second pixel transformation curve based on the second image analysis; and 3) creating a third pixel transformation curve based on the second image analysis, where the determining the first image enhancements on the red pixel data comprises determining the first image enhancements on the red pixel data based on the first pixel transformation, where the determining the second image enhancements on the green pixel data comprises determining the second image enhancements on the green pixel data based on the second pixel transformation, and where the determining the third image enhancements on the blue pixel data comprises determining the third image enhancements on the blue pixel data based on the third pixel transformation.

In Example 25, the subject matter of any of Examples 9-24 can optionally store the first pixel transformation curve as a LUT, the second pixel transformation curve as a second LUT, and the third pixel transformation curve as a third LUT.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 26 is a non-transitory, computer-readable storage medium including instructions that, when executed by a computing system, cause the computing system to perform the method of Examples 9-25.

Example 27 is a system for content adaptive power management of a projector system comprising 1) a projector system comprising an imager and a light source; and 2) an integrated circuit coupled to the projector system, wherein the integrated circuit comprises a frame buffer and an image processing block, wherein the image processing block is configured to: a) receive image data from the frame buffer; b) analyze the image data; c) adjust a light control signal for the light source based on the analyzed image data; d) adjust pixel values of the image data based on the analyzed image data; and e) send the adjusted pixel values to the imager of the projector system and the light control signal to the light source of the projector system.

In Example 28, the subject matter of Example 27 can optionally comprise 1) an image analysis block to receive the image data from the frame buffer, wherein the image analysis block is configured to calculate a color histogram representing a distribution of colors in the image data; 2) an image transfer curve generation block coupled to an output of the image analysis block, wherein the image transfer curve generation block is configured to create a pixel transformation curve based on the color histogram, to modulate the light control signal to adjust a projector brightness of the light source, to modulate a pixel control signal, and to send the light control signal to the light source; and 3) an image adaptation block to receive the image data from the frame buffer and the pixel control signal from the image transfer curve generation block, wherein the image adaptation block is configured to adjust the pixel values of the image data based on the pixel control signal and to send the adjusted pixel values to the imager.

In Example 28, the subject matter of any one of Examples 26-27 can optionally reside in a display controller configured to send display data comprising the pixel data and the light control signal to the projector system over a second interface, wherein the second interface is an external interface.

In Example 29, the subject matter of any one of Examples 26-28 can optionally reside in the projector system comprising the frame buffer, the image processing block, the imager, and the light source, and wherein a first interface and a second interface are internal interfaces.

In Example 30, the subject matter of any one of Examples 26-29 can optionally comprise a red light source, a green light source, and a blue light source, and wherein the image processing block is configured to perform separate image analysis of a red sub-frame, a green sub-frame, and a blue sub-frame of the image data to determine first image enhancements on red pixel data, second image enhancements on green pixel data, and third image enhancements on blue pixel data, respectively, and to determine a first backlight adjustment on the red light source, a second backlight adjustment on the green light source, and a third backlight adjustment on the blue light source.

In Example 31, the subject matter of any one of Examples 26-30 can optionally be a DLP projector system.

In Example 32, the subject matter of any one of Examples 26-30 can optionally be a LCoS projector system.

Example 33 is an apparatus for power management of a projector system, comprising: 1) a first interface to receive image data to be displayed by the projector system comprising an imager system and a light source; 2) a second interface coupled to send pixel data to the imager and a light control signal to the light source; 3) means for analyzing the image data received on the first interface; 4) means for adjusting a light control signal for the light source based on the analyzed image data; 5) means for adjusting pixel values of the image data based on the analyzed image data; and 6) means for send the adjusted pixel values as the pixel data on the second interface to the imager.

In Example 34, the subject matter of Example 33 can optionally comprise 1) means for calculating a color histogram representing a distribution of colors in the image data; and 2) means for creating a pixel transformation curve based on the color histogram, wherein the means for adjusting the light control signal comprises means for modulating the light control signal on the second interface to adjust a projector brightness of the light source, and wherein the means for adjusting the pixel values comprises means for modulating a pixel control signal.

Example 35 is an apparatus comprising a memory and a computing system coupled to the memory, wherein the computing system is configured to perform the method of any one of Examples 9-25.

In Example 36, the subject matter of Example 36 can optionally comprise 1) a first interface to receive the image data; 2) a second interface coupled to the imager and the light source of the projector system; and 3) an image processing block coupled to the first interface and the second interface.

In Example 37, the subject matter of any one of Examples 26-30 can optionally comprise: 1) an image analysis block coupled to the first interface; 2) an image transfer curve generation block coupled to an output of the image analysis block; and 3) an image adaptation block coupled to the first interface and the image transfer curve generation block.

In Example 38, the subject matter of any one of Examples 35-37 can optionally reside in a display controller configured to send display data comprising the pixel data and the light control signal to the projector system over a second interface, wherein the second interface is an external interface.

In Example 39, the subject matter of any one of Examples 35-38 can optionally reside in the projector system comprising the frame buffer, the image processing block, the imager, and the light source, and wherein a first interface and a second interface are internal interfaces.

In Example 40, the subject matter of any one of Examples 35-39 can optionally comprise a red light source, a green light source, and a blue light source, and wherein the image processing block is configured to perform separate image analysis of a red sub-frame, a green sub-frame, and a blue sub-frame of the image data to determine first image enhancements on red pixel data, second image enhancements on green pixel data, and third image enhancements on blue pixel data, respectively, and to determine a first backlight adjustment on the red light source, a second backlight adjustment on the green light source, and a third backlight adjustment on the blue light source.

In Example 41, the subject matter of any one of Examples 35-40 can optionally be a DLP projector system.

In Example 42, the subject matter of any one of Examples 35-40 can optionally be a LCoS projector system.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing system comprising:
    a first interface to receive image data to be displayed by a projector system comprising an imager and a multi-color light source, the multi-color light source being operable to emit only a first color of light, only a second color of light, and only a third color of light in a time sequential order, wherein the first color, the second color, and the third color are different colors;
    a second interface to send pixel data to the imager and a light control signal to the multi-color light source; and
    an image processing block coupled to the first interface and the second interface, wherein the image processing block is to:
        analyze the image data to determine pixel values of color sub-frames, wherein the pixel values comprise a first set of pixel values for the first color, a second set of pixel values for the second color, and a third set of pixel values for the third color;
        determine a ratio to increase the first set of pixel values and decrease the light control signal to decrease a power consumption level by the projector system and maintain a substantially equivalent image perception level for the image data;
        adjust the light control signal based on the ratio;
        determine the second set of pixel values is below a threshold value;
        adjust the light control signal to turn off the second color of the multi-color light source during the time sequential order;
        adjust the first set of pixel values, the second set of pixel values, and the third set of pixel values of the image data based on the ratio to obtain a first set of adjusted pixel values for the first color, a second set of adjusted pixel values for the second color, and a third set of adjusted pixel values for the third color, wherein the pixel data comprises the first set of adjusted pixel values, the second set of adjusted pixel values, and the third set of adjusted pixel values;
        send, to the imager, the first set of adjusted pixel values;
        send, to the imager, the second set of adjusted pixel values after the first set of adjusted pixel values is sent;
        send, to the imager, the third set of adjusted pixel values after the second set of adjusted pixel values is sent; and
        send, to the multi-color light source, the light control signal on the second interface to control the multi-color light source to emit only the first color of light, and only the third color of light in the time sequential order.

2. The computing system of claim 1, wherein the image processing block comprises:
    an image analysis block to receive the image data on the first interface, wherein the image analysis block is to calculate a color histogram representing a distribution of colors in the image data;
    an image transfer curve generation block coupled to an output of the image analysis block, wherein the image transfer curve generation block is to create a pixel transformation curve based on the color histogram, to adjust the light control signal, and to adjust a pixel control signal; and
    an image adaptation block to receive the image data on the first interface and the pixel control signal from the image transfer curve generation block, wherein the image adaptation block is to:
        adjust the pixel values of the image data based on the pixel control signal, and send the first set of adjusted pixel values for the first color, the second set of adjusted pixel values for the second color, and the third set of adjusted pixel values and the third color as the pixel data on the second interface to the imager.

3. The computing system of claim 2, wherein the image transfer curve generation block is to modulate the light control signal and modulate the pixel control signal.

4. The computing system of claim 1, wherein:
the multi-color light source comprises a red light source, a green light source, and a blue light source, and
the image processing block is to:
perform separate image analysis of the color sub-frames, wherein the color sub-frames comprise red sub-frames, green sub-frames, and blue sub-frames;
determine image enhancements on the pixel data, wherein:
the first set of pixel values is for red pixel data of the red sub-frames,
the second set of pixel values is for green pixel data of the green sub-frames, and
the third set of pixel values is for blue pixel data of the blue sub-frames; and
determine a first backlight adjustment on the red light source, a second backlight adjustment on the green light source, and a third backlight adjustment on the blue light source.

5. The computing system of claim 1, wherein the projector system is at least one of a digital light processing (DLP) projector system or a Liquid Crystal on Silicon (LCoS) projector system.

6. A method comprising:
analyzing image data to determine pixel values of color sub-frames, wherein:
the pixel values comprise a first set of pixel values for a first color, a second set of pixel values for a second color, and a third set of pixel values for a third color;
the image data is to be displayed by a projector system comprising a multi-color light source and an imager, the multi-color light source being operable to emit only the first color, only the second color, and only the third color in a time sequential order, wherein the first color, the second color, and the third color are different colors;
determining a ratio to increase the first set of pixel values and decrease a light control signal to decrease a power consumption level by the projector system and maintain a substantially equivalent image perception level for the image data;
adjusting the light control signal for the multi-color light source based on the ratio;
determining the second set of pixel values is below a threshold value;
adjusting the light control signal to turn off the second color of the multi-color light source during the time sequential order;
adjusting the first set of pixel values for the first color, the second set of pixel values for the second color, and the third set of pixel values for the third color of the image data based on the ratio to obtain a first set of adjusted pixel values for the first color, a second set of adjusted pixel values for the second color, and a third set of adjusted pixel values for the third color;
sending the first set of adjusted pixel values to the imager; and
sending the third set of adjusted pixel values to the imager after the first set of adjusted pixel values is sent.

7. The method of claim 6, wherein the adjusting the pixel values comprises modulating the pixel values by a first ratio to obtain modulated pixel values.

8. The method of claim 7, wherein the adjusting the pixel values comprises adjusting the pixel values based on a pixel transformation curve, wherein the pixel transformation curve is stored as a look-up-table (LUT), and wherein the adjusting the pixel values comprises performing a look-up operation in the LUT with an input pixel value to determine an adjusted pixel value for the pixel values.

9. The method of claim 8, further comprising sending the modulated pixel values and the light control signal over a display interface of the projector system, wherein the projector system is to modulate the multi-color light source according to the light control signal.

10. The method of claim 7, wherein the modulating the multi-color light source comprises modulating the multi-color light source at a same ratio as the first ratio as the adjusting the pixel values.

11. The method of claim 10, wherein the analyzing the image data comprises:
calculating a color histogram representing a distribution of colors in the image data; and
creating a pixel transformation curve based on the color histogram.

12. The method of claim 11, wherein the analyzing the image data further comprises at least one of:
determining a maximum value in a red-green-blue (RGB) color space;
determining a value (V) in a hue-saturation-value (HSV) color space; or
determining a brightness value (B) of a hue-saturation-brightness (HSB) color space.

13. The method of claim 6, wherein the analyzing the image data comprises:
performing a first image analysis of the image data based on a red (R) sub-frame;
performing a second image analysis of the image data based on a green (G) sub-frame;
performing a third image analysis of the image data based on a blue (B) sub-frame, and wherein the adjusting the pixel values comprises:
determining first image enhancements on red pixel data based on the first image analysis;
determining second image enhancements on green pixel data based on the second image analysis; and
determining third image enhancements on blue pixel data based on the third image analysis.

14. The method of claim 13, wherein the multi-color light source comprises a red light source, a green light source, and a blue light source, wherein the adjusting the light control signal comprises:
modulating a first light control signal that drives the red light source at a first ratio;
modulating a second light control signal that drives the green light source at a second ratio; and
modulating a third light control signal that drives the blue light source at a third ratio.

15. The method of claim 14, wherein the analyzing the image data further comprises:
creating a first pixel transformation curve based on the first image analysis;
creating a second pixel transformation curve based on the second image analysis; and
creating a third pixel transformation curve based on the second image analysis, wherein the determining the first image enhancements on the red pixel data comprises determining the first image enhancements on the red pixel data based on the first pixel transformation, wherein the determining the second image enhancements on the green pixel data comprises determining the second image enhancements on the green pixel data based on the second pixel transformation, and wherein the determining the third image enhancements on the blue pixel data comprises determining the third image enhancements on the blue pixel data based on the third pixel transformation, wherein the first pixel transformation curve is stored as a first look-up-table (LUT), the second pixel transformation curve is stored as a second LUT, and the third pixel transformation curve is stored as a third LUT.

16. A non-transitory, computer-readable storage medium including instructions that, when executed by a computing system, cause the computing system to perform operations comprising:
  analyzing image data to determine pixel values of color sub-frames, wherein:
    the pixel values comprise a first set of pixel values for a first color, a second set of pixel values for a second color, and a third set of pixel values for a third color;
    the image data is to be displayed by a projector system comprising a multi-color light source and an imager, the multi-color light source being operable to emit only a first color of light, only a second color of light, and only a third color of light in a time sequential order, wherein the first color, the second color, and the third color are different colors;
  determining a ratio to increase the first set of pixel values and decrease a light control signal to decrease a power consumption level by the projector system and maintain a substantially equivalent image perception level for the image data;
  adjusting the light control signal for the multi-color light source based on the ratio;
  determining the second set of pixel values is below a threshold value;
  adjusting the light control signal to turn off the second color of the multi-color light source during the time sequential order;
  adjusting the first set of pixel values for the first color, the second set of pixel values for the second color, and the third set of pixel values for the third color of the image data based on the ratio to obtain a first set of adjusted pixel values for the first color, a second set of adjusted pixel values for the second color, and a third set of adjusted pixel values for the third color;
  sending the first set of adjusted pixel values to the imager; and
  sending the third set of adjusted pixel values to the imager after the first set of adjusted pixel values is sent.

17. The storage medium of claim 16, wherein the analyzing the image data comprises:
  calculating a color histogram representing a distribution of colors in the image data; and
  creating a pixel transformation curve based on the color histogram, wherein the adjusting the pixel values comprises adjusting the pixel values based on the pixel transformation curve.

18. The storage medium of claim 17, wherein the pixel transformation curve is stored as a look-up-table (LUT), and wherein the adjusting the pixel values comprises performing a look-up operation in the LUT with an input pixel value to determine an adjusted pixel value for the pixel values.

19. The storage medium of claim 16, wherein the adjusting the pixel values comprises modulating the pixel values by a first ratio, wherein the adjusting the light control signal comprise modulating the light control signal that drives the multi-color light source.

20. The storage medium of claim 19, wherein the modulating the multi-color light source comprises modulating the multi-color light source at a same ratio as the first ratio as the adjusting the pixel values.

21. A system comprising:
  a projector system comprising an imager and a multi-color light source, the multi-color light source being operable to emit only a first color of light, only a second color of light, and only a third color of light in a time sequential order, wherein the first color, the second color, and the third color are different colors; and
  an image processing block coupled to the projector system, wherein the image processing block is to:
    analyze image data to determine pixel values of color sub-frames, wherein:
      the pixel values comprise a first set of pixel values for the first color, a second set of pixel values for the second color, and a third set of pixel values for the third color;
    determine a ratio to increase the first set of pixel values and decrease a light control signal to decrease a power consumption level by the projector system and maintain a substantially equivalent image perception level for the image data;
    adjust a projector brightness of the multi-color light source using the light control signal based on the ratio;
    determine the second set of pixel values is below a threshold value;
    adjust the light control signal to turn off the second color of the multi-color light source during the time sequential order;
    adjust the first set of pixel values, the second set of pixel values, and the third set of pixel values of the image data based on the image data based on the ratio to obtain a first set of adjusted pixel values for the first color, a second set of adjusted pixel values for the second color, and a third set of adjusted pixel values for the third color;
    send, to the imager, the first set of adjusted pixel values;
    send, to the imager, the third set of adjusted pixel values after the first set of adjusted pixel values is sent; and
    send, to the multi-color light source, the light control signal to control the multi-color light source to emit only the first color of light, only the second color of light, and only the third color of light in the time sequential order.

22. The system of claim 21, wherein the image processing block comprises:
  an image analysis block to receive the image data, wherein the image analysis block is to calculate a color histogram representing a distribution of colors in the image data;
  an image transfer curve generation block coupled to an output of the image analysis block, wherein the image transfer curve generation block is to create a pixel transformation curve based on the color histogram, to modulate the light control signal to adjust the projector brightness of the multi-color light source, to modulate a pixel control signal, and to send the light control signal to the multi-color light source; and an image adaptation block to receive the image data and the pixel control signal from the image transfer curve generation block, wherein the image adaptation block is to adjust the pixel values of the image data based on the pixel control signal and to send the first set of adjusted pixel values, the second set of adjusted pixel values, and the third set of adjusted pixel values to the imager.

* * * * *